United States Patent
Casati et al.

(10) Patent No.: US 8,649,786 B2
(45) Date of Patent: Feb. 11, 2014

(54) REGISTERING A MOBILE TERMINAL IN AN AREA OF OVERLAPPING CELL COVERAGE BY FIRST AND SECOND NETWORKS

(75) Inventors: Alessio Casati, Swindon (GB); Sudeep Kumar Palat, Swindon (GB); Christophe Demarez, Igny (FR); Said Tatesh, Swindon (GB)

(73) Assignee: Alcatel Lucent, Paris (FR)

( * ) Notice: Subject to any disclaimer, the term of this patent is extended or adjusted under 35 U.S.C. 154(b) by 736 days.

(21) Appl. No.: 12/526,115

(22) PCT Filed: Jan. 15, 2008

(86) PCT No.: PCT/EP2008/000325
§ 371 (c)(1),
(2), (4) Date: Jan. 11, 2010

(87) PCT Pub. No.: WO2008/095590
PCT Pub. Date: Aug. 14, 2008

(65) Prior Publication Data
US 2010/0113015 A1    May 6, 2010

(30) Foreign Application Priority Data
Feb. 6, 2007 (GB) .................................. 0702242.9

(51) Int. Cl.
*H04W 8/02* (2009.01)

(52) U.S. Cl.
USPC .................... 455/432.1; 455/435.1; 455/422.1

(58) Field of Classification Search
USPC ......... 455/432.1, 435.1, 422.1, 449; 715/736; 345/419
See application file for complete search history.

(56) References Cited

U.S. PATENT DOCUMENTS

| | | | | |
|---|---|---|---|---|
| 6,714,217 B2 * | 3/2004 | Huang et al. | ................... | 715/736 |
| 6,934,540 B2 * | 8/2005 | Twitchell, Jr. | ............. | 455/422.1 |
| 2006/0229068 A1 | 10/2006 | Niemela et al. | | |

FOREIGN PATENT DOCUMENTS

| | | |
|---|---|---|
| JP | 11341545 A | 12/1999 |
| WO | WO 96/33588 A1 | 10/1996 |
| WO | WO 02/09464 A1 | 1/2002 |
| WO | WO 2006/055629 A2 | 5/2006 |

OTHER PUBLICATIONS

"3rd Generation Partnership Project; Technical Specification Group Services and System Architecture Evolution: Report on Technical Options and Conclusions (Release 7)" 3rd Generation Partnership Project (3GPP); Technical Report (TR), XX, XX, vol. 23.882, No. drftv0.6.0, XP002422811, pp. 1-27, Sep. 1, 2005.
International Search Report.

* cited by examiner

Primary Examiner — Phuoc H Doan

(57) ABSTRACT

A method is provided of registering a mobile terminal in an area of overlapping cell coverage by first and second networks for wireless mobile telecommunications. The networks are of different types. The method comprises: storing an identifier of the mobile terminal; storing in a controller a first record of in which cell or group of cells the mobile terminal is located in the first network and a second record of in which cell or group of cells the mobile terminal is located in the second network; and providing the mobile terminal with information of both records and said identifier.

37 Claims, 8 Drawing Sheets

REGISTERING A MOBILE TERMINAL IN AN AREA OF OVERLAPPING CELL COVERAGE BY FIRST AND SECOND NETWORKS

TECHNICAL FIELD

The present invention relates to telecommunications, in particular wireless telecommunications.

DESCRIPTION OF THE RELATED ART

To date, a known solution to optimize mobility management signaling, across two different access technologies, is to have a single core network node that handles both the technologies and to share routing area identities between the two technologies. This approach has been used in systems having access technologies of a Universal Mobile Telecommunications System (UMTS) network and a Global System for Mobiles (GSM) network. This is not a flexible approach as it constrains deployment options.

SUMMARY OF THE INVENTION

Methods and apparatus according to the present invention are set out in the appended claims, to which the reader is now referred. Preferred features are laid out in the dependent claims.

A method is provided of registering a mobile terminal in an area of overlapping cell coverage by first and second networks for wireless mobile telecommunications. The networks are of different types. The method comprises:
  storing an identifier of the mobile terminal;
  storing in a controller a first record of in which cell or group of cells the mobile terminal is located in the first network and a second record of in which cell or group of cells the mobile terminal is located in the second network; and
  providing the mobile terminal with information of both records and said identifier.

Accordingly, in preferred embodiments, a method is provided by which a dual-mode user terminal, which is capable of using different radio transmission technologies, can transfer connection between the two technologies while in Idle mode without generating large amounts of location update signalling. The two technologies may be, for example, on the one hand, Wideband Code Division Multiple Access (WCDMA)-based Universal Mobile Telecommunications System (UMTS) and, on the other hand, Orthogonal Frequency Division Multiple Access (OFDMA) based UMTS Long Term Evolution—also Known as LTE). User terminals are often referred to as User Equipment (UE).

The proposed approach allows, in some embodiments, for independent allocation of routing area identities and network planning and also allows the usage of substantially independent core network nodes (albeit the two core nodes may interact with one another).

A procedure is preferably provided to register the mobile in the two networks by means of just one registration by the user terminal, for the purpose of reducing location update signalling messages from the user terminal every time the user terminal transfers between the two networks.

The radio access network (RAN) of the first network preferably holds a mapping record, for each of its cells of the tracking area, of the corresponding "overlay" cell of the other network. The RAN of the first network preferably provides the Tracking Area/Routing Area of the cells of both networks to the core network.

The core network of one network preferably uses this information, on its own or along with temporary identifiers of the user terminal that are provided by the user terminal, to identify the core network of the other network. The core network of the first network preferably performs a proxy registration with the core network of the other network on behalf of the user terminal.

Preferably, the Tracking Area/Routing Area, or a list of Tracking Areas and Routing Areas, are provided to the user terminal to inform of what may be considered as "Equivalent Tracking" areas, within which the mobile may roam without generating any location update signaling.

BRIEF DESCRIPTION OF THE DRAWINGS

Preferred embodiments of the present invention will now be described by way of example and with reference to the drawing, in which.

DETAILED DESCRIPTION

The system of networks will first be described followed by a description of the Attach procedure and Tracking and Routing Area update procedure used in the system. A description of the Paging procedure used in the network to deliver downlink data to the user terminal in Idle mode is also provided.

The Networks

Figure 1:
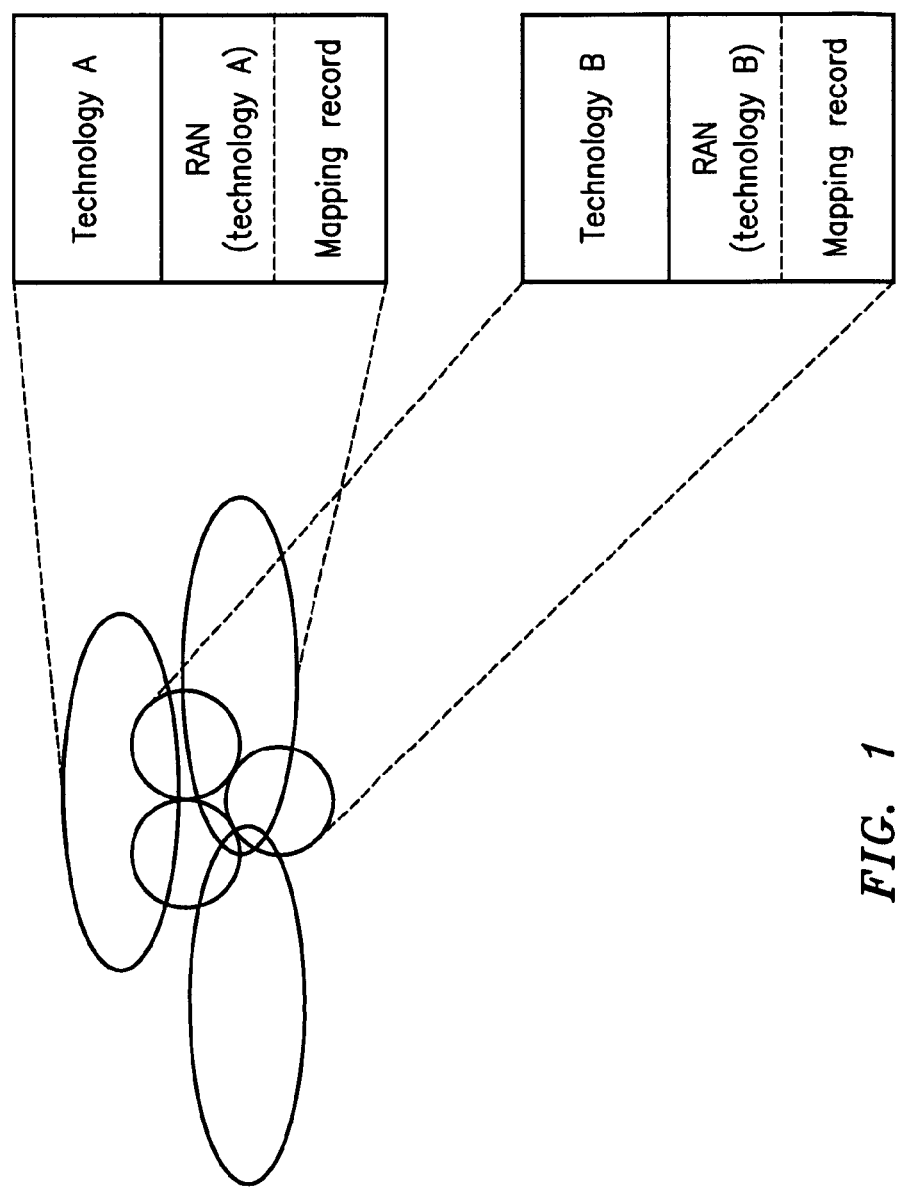
FIG. 1 is a diagram of a system according to the present invention.

As shown in FIG. 1, there are two technologies (technology A and technology B) with overlapping cells and coverage area. The radio access network (RAN) of each technology keeps a mapping record of the Routing Area (RA)/Tracking Area (TA) for each of its cells and also the overlapping cell of the other technology. For example, a RAN of Technology A knows the Routing Area of each of its cells and also the corresponding Tracking Area of the cells of Technology B which overlap the cells of technology A.

Figure 2:
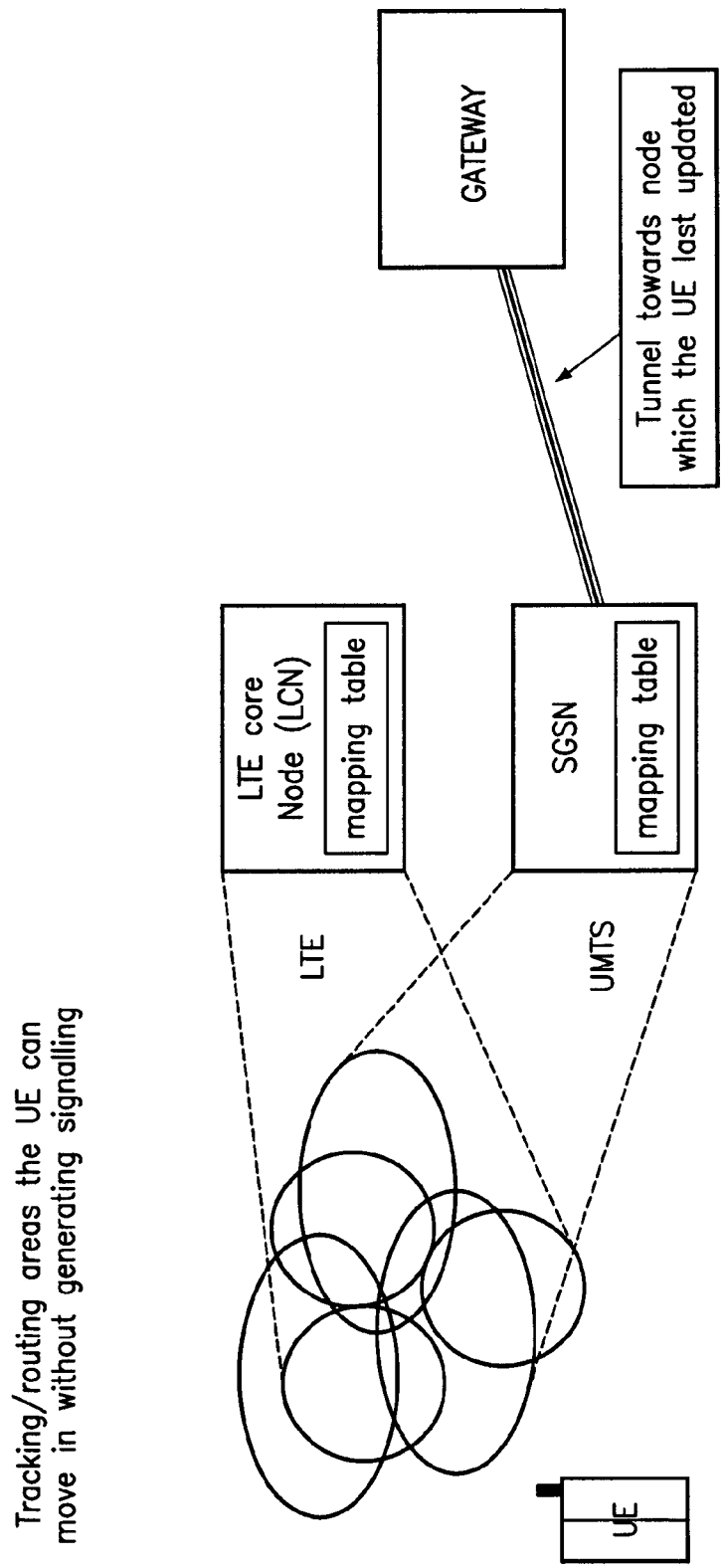
FIG. 2 is a more detailed diagram of the networks shown in FIG. 1 showing the overlapping coverage areas.

As shown in FIG. 2, in the networks, technology A is Long Term Evolution (LTE) and Technology B is Universal Mobile Telecommunications System (UMTS). The LTE and UMTS core networks are also shown connected to a Gateway and the Home Subscriber Server/Home Location Register (HSS/HLR). The core network of technology A is a LTE Core Node (LCN) and the core network of technology B is a Serving GPRS Support Node (SGSN), where GPRS denotes General Packet Radio System. A dual-mode, specifically LTE and UMTS capable, user terminal is also shown. The core network node (SGSN) in technology B is also linked by a tunnel towards the Gateway as shown in FIG. 2 acting as an anchor (and in the remainder of this description referred to as Gateway Node), so that the user terminal can be reached by packets intended for that user terminal.

Core network nodes in one technology need to keep a mapping table that relates the addresses of nodes in the core network of the other technology to the identities of the tracking/routing areas of the other technology. The mapping table is based on a list of tracking/routing areas associated to one (or more) addresses of the core network node that handles them.

Alternatively, in an otherwise similar embodiment (not shown), the mapping table in one technology uses the user terminal identifiers of known type, namely UE identity (P-TMSI or LTE TMSI (referred to as L-TMSI)), of the other technology, in order to identify the core network identity of that other technology.

Network Attachment Procedure

Figure 3:
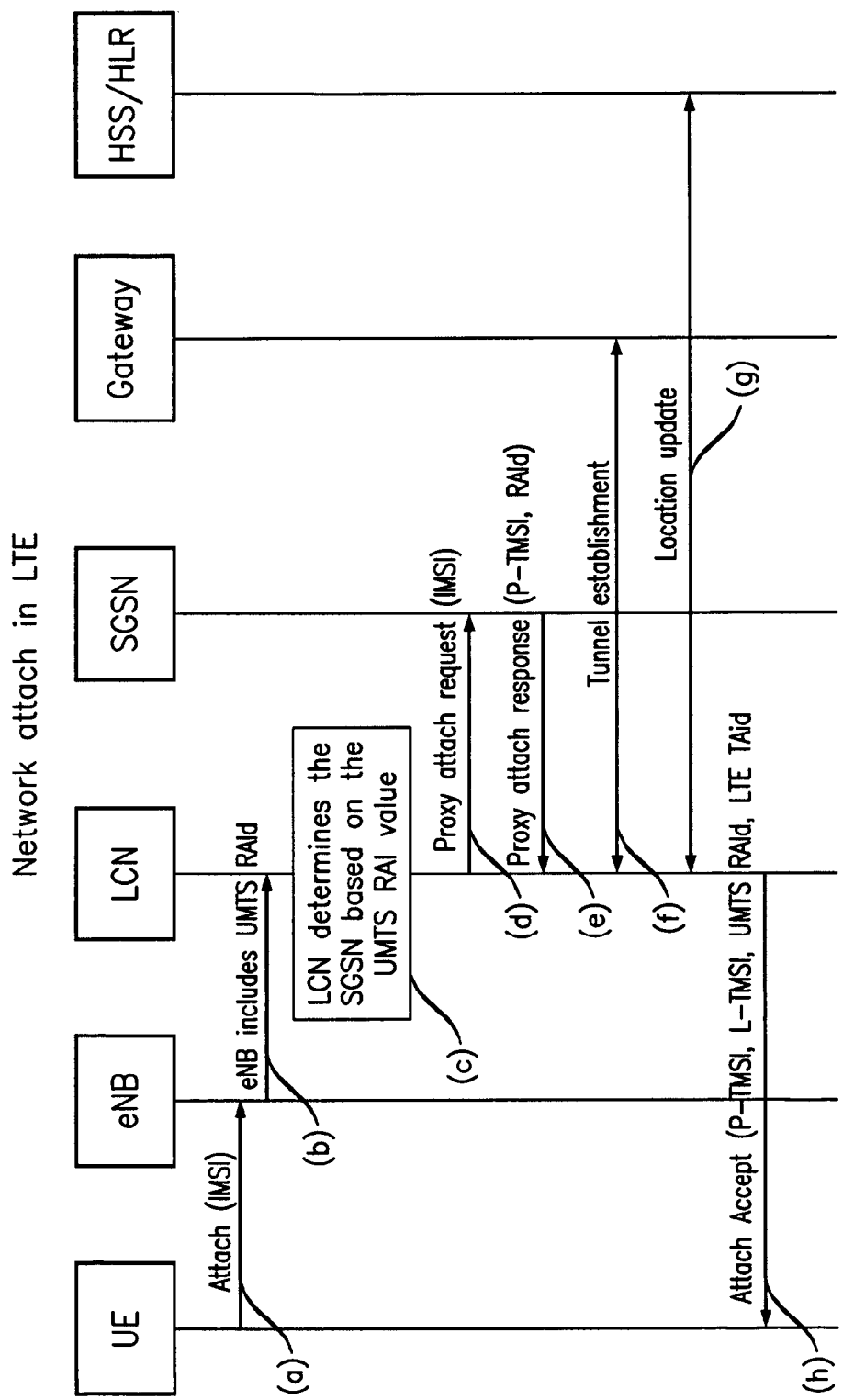
FIG. 3 is a sequence diagram illustrating a network attachment procedure in the LTE network shown in FIG. 2.

Basically speaking, FIG. 3 relates to the situation where a user terminal (user equipment, UE) attaches in one technology (Technology A), and the Radio Access Network (RAN) of Technology A includes the Tracking Area (TA) of the cell of Technology A in which the user terminal is performing the Attach, as well as the routing area of Technology B of the overlapping cell of technology B, into the Attach request, before passing the Attach Request to the core network (CN) of technology A. The core network node of this technology A performs a proxy registration of the user terminal with the core network node of the other technology (Technology B). The Core network node of technology B is determined by the core network node in technology A based on the value of the routing area (RA)) identity of technology B included by the RAN of technology A in the attach message. In the example shown in FIG. 3, Technology A is Long Term Evolution (LTE), RAN of technology A is enhanced NodeB (eNB), Technology B is Universal Mobile Telecommunications System (UMTS). The core of technology B is the Serving GPRS Support Node (SGSN) and the core network node of technology A is the LTE core node (LCN).

As shown in FIG. 3, more specifically, the Attach request is sent (step a) by the user terminal (user equipment, UE) towards the eNB. The Attach request contains the user terminal's International Mobile Subscriber Identity (UE IMSI). The enhanced NodeB (eNB) forwards (step b) this to the LTE core network (LCN); the eNB also includes the UMTS routing area identity (RAId) of the overlapping UMTS cell found by using the mapping table maintained in the eNB. The LCN determines, i.e., identifies the associated SGSN (step c) based on the UMTS RAId value received in step b using the core network mapping table. The LCN then sends (step d) a proxy Attach request including the UE IMSI to the Serving GPRS Support Node (SGSN). This is acknowledged by the SGSN in step e. The LCN then establishes (step f) a tunnel towards the gateway and also performs (step g) a Location update towards the Home Subscriber Server/Home Location Register (HSS/HLR). After completion of these procedures, the LCN sends (step h) an Attach Accept to the user terminal including the user terminal's temporary identity in UMTS (packet temporary mobile subscriber identity, P-TMSI), temporary mobile subscriber identity in LTE (L-TMSI), the UMTS Routing Area identity (RAId), and LTE Tracking Area Identity (TAId).

Thus, after the process of attach in technology A and the proxy registration in technology B are complete, the user terminal will have acquired the Routing Area/Tracking Area identities in the two technologies and the temporary identities in the two technologies, which also bind the user terminal to a particular core network node (the identities implicitly identify the core node) in the two technologies.

In this condition, the user terminal will not generate any location update signaling as long as it stays within the same Tracking Area/Routing Area as at the initial registration time, even if the user terminal changes the technology, A or B, to which it is connected, e.g. see FIG. 2. When the boundaries of the initial Tracking Area/Routing Area are crossed, then the user terminal will need to perform a Tracking Area/Routing Area update procedure with the Core network node of the technology that the user terminal is currently camping on.

Tracking Area Update Procedures

Figure 4:
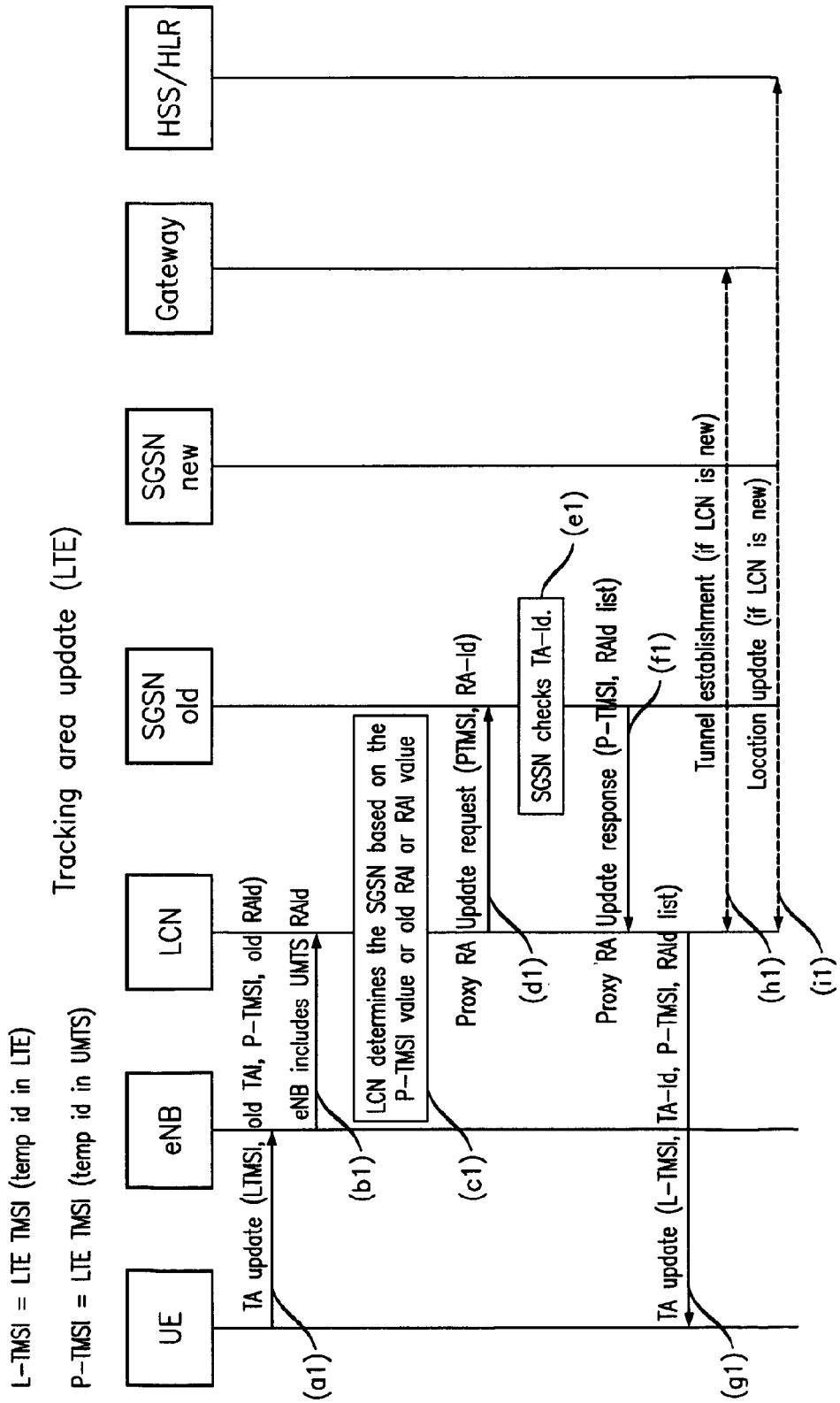
FIG. 4 is a sequence diagram illustrating a first Tracking area update scenario in the LTE network.
Figure 5:
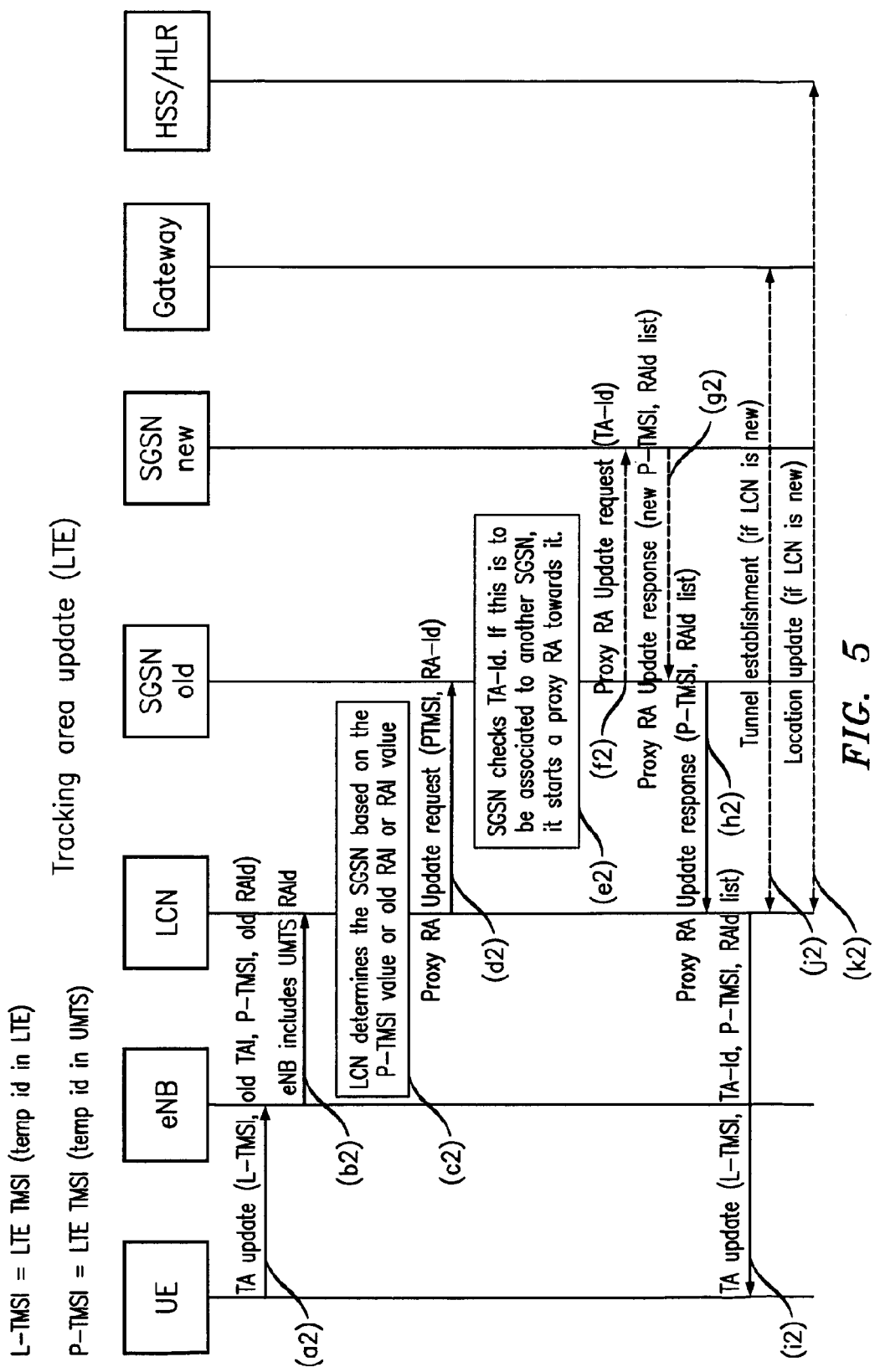
FIG. 5 is a sequence diagram illustrating a second Tracking area update scenario where the Serving GPRS Support Node (SGSN) has changed and the SGSN_old performing a proxy update towards the SGSN_new.
Figure 6:
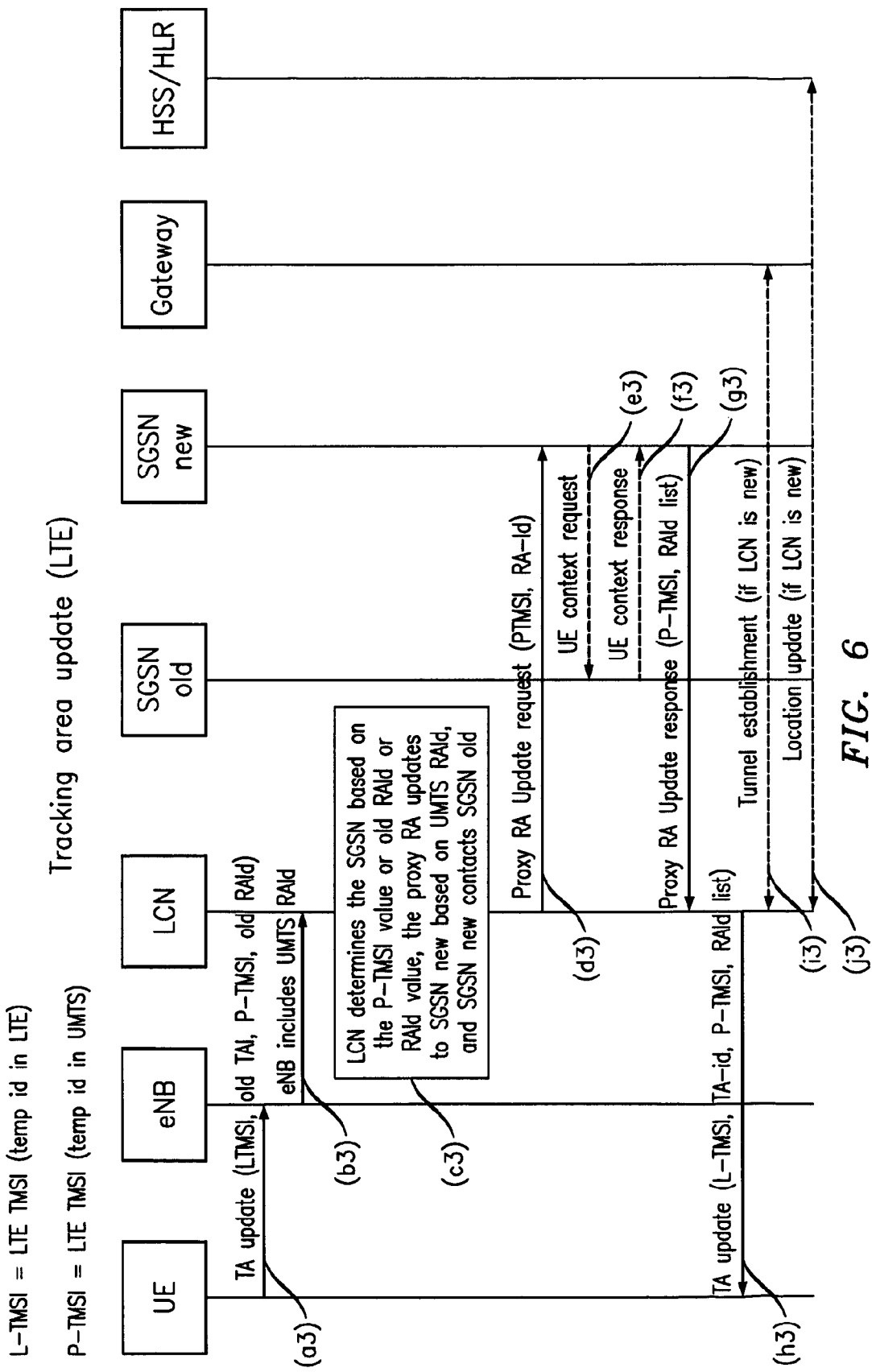
FIG. 6 is a sequence diagram illustrating a third Tracking area update scenario where the SGSN has changed and the base station (eNB) performs a proxy update directly towards the SGSN_new.

Three tracking area update scenarios will now be described. FIG. 4 shows the user terminal performing a tracking area update towards the Long Term Evolution (LTE) radio access network (RAN). The LTE core network performs a proxy registration with the UMTS core network where the SGSN is unchanged. The eNB appends the UMTS Routing Area while forwarding the Tracking Area update towards the LCN. The user terminal is provided with the list of Tracking Area and RAs in the Tracking Area update Accept within which it does not need to perform any update. In both FIG. 5 and FIG. 6, the SGSN_new is different from the SGSN_old. In FIG. 5, the eNB performs a proxy registration towards the SGSN_old and the SGSN_old forward the proxy registration to the SGSN_new. In FIG. 6, the eNB performs the proxy registration directly towards the SGSN_new.

These three scenarios are now described in turn, referring respectively to FIGS. 4, 5 and 6.

Tracking Area Update where the Core Network of Technology B is Unchanged

As shown in FIG. 4, say that the user terminal is camped on technology A, namely LTE. When the user terminal crosses the combined set of tracking areas provided in the Attach Accept message in shown in FIG. 3, the user terminal performs a Tracking area towards the eNB (step a1). When the RAN (eNB) of the technology A (LTE) receives this message, it includes (step b1) the RAId of the cell of technology B (UMTS) of the overlapping UMTS cell using the mapping table maintained in the eNB. Core network node (LCN) in technology A receives this Tracking Area/Routing Area update, identifies the core network node (SGSN_old) of technology B based on the temporary identity of the UE in technology B, or the RAId of technology B, using the mapping table maintained in the core network (step c1). The LCN then sends a Proxy Routing Area update request (step d1) towards the core network node (SGSN_old) in technology B.

The core network node in technology B checks (step e1) this Tracking Area/Routing Area identity value and if this value is compatible with the values that the core network node manages, the core network node will return one (or a list of) Tracking Area(s)/Routing Area(s) in technology B that can be considered valid for the user terminal to move within without generating signaling (step f1).

This set of information will then be sent (step g1) to the user terminal in the Tracking Area/Routing Area update response along with one Tracking Area/Routing Area identity, or a list of Tracking Area/Routing Area identities, in technology A, within which the user terminal can move without generating signaling. Also, the Gateway Node is updated (step h1 and i1) with the address of the core network node in technology A if the address is different (that is, if there is a change in the CN node). As a result, the user terminal acquires a list of Tracking Area(s)/Routing Area(s) in both technologies, allowing the user terminal to move within the Tracking Area/Routing Area of the two technologies without generating Tracking Area/Routing Area update signaling. Also, the user terminal has now temporary identities consistent with the core node that is handling the user terminal in each technology.

Two Scenarios for Tracking Area Updates where the Core Network of Technology B has Changed In FIG. 5, steps a2 to d2 and h2 to k2 are the same as in steps a1 to d1 and steps f1 to i1 respectively referred to above in respect of FIG. 4. If in the SGSN_old the Tracking Area/Routing Area identity value will point (step e2) to the address of an alternate core network node (SGSN_new) in technology B, the SGSN_old will forward (step f2) the proxy registration to this node. This node will then repeat the check of the Routing Area/Tracking Area value and will return (step g2) to the core network node (LCN) in technology A, via (step h2) the first core network node (SGSN_old) in technology B, one (or a list of) Tracking Area/Routing Area in technology B that can be considered valid for the user terminal to move within without generating signalling, along with a temporary identity in technology B to be used by the user terminal.

In FIG. 6, steps a3 to b3 and h3 to j3 are the same as in steps a1 to b1 and steps g1 to i1 respectively referred to above in respect of FIG. 3. In an alternative embodiment, the core network node (LCN) of technology A sends (step d3) the Proxy update to the new core network node (step c3) of technology B identified by the TAId of technology B. The new core network node then retrieves (step e3 and f3) the user terminal's context signal from the old CN (SGSN_old) of technology B. The SGSN_new then sends (step g3) the Proxy update response to the core network (LCN) of technology A.

Routing Area Update

Figure 7:
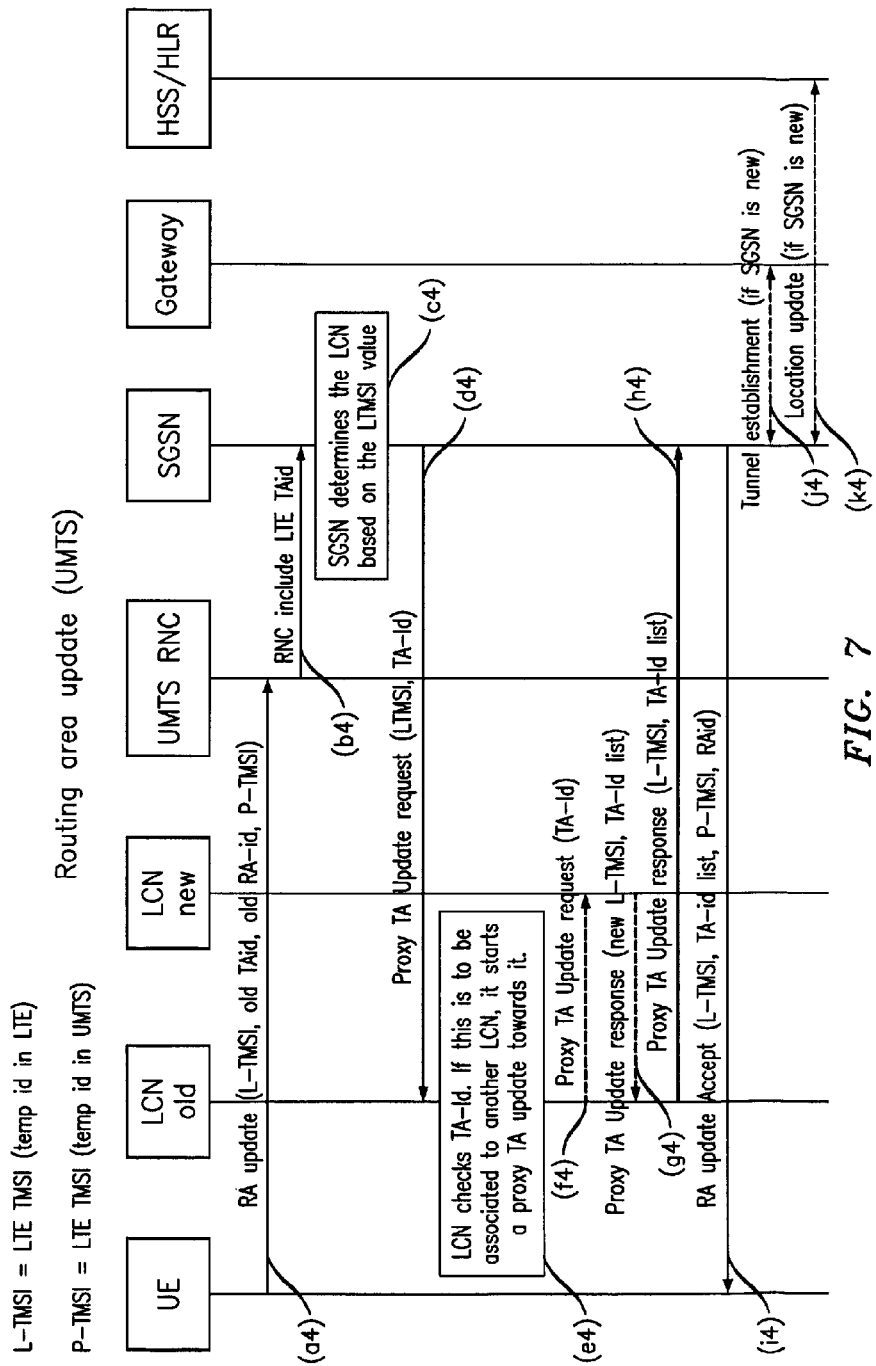
FIG. 7 is a sequence diagram illustrating a Routing area update procedure in UMTS.

Basically speaking, FIG. 7 relates to the user terminal performing a Routing area update towards the UMTS radio access network (RAN). The UMTS core network performs the proxy registration towards the LTE core network. The UMTS radio network controller (RNC) appends the LTE Tracking Area while forwarding the Routing Area update towards the Serving GPRS Support Node (SGSN). The user terminal is provided with the list of Tracking Areas and Routing areas within which it does not need to perform any update.

As shown in FIG. 7, more specifically, the user terminal sends (step a4) a Routing area update towards the UMTS RNC and the RNC then forwards (step b4) it to the SGSN and also includes the overlapping LTE TAId using the mapping record stored in the RNC. The SGSN determines (step c4) the LCN of the UE based on the L-TMSI using the mapping table maintained in the SGSN. The SGSN then performs (step d4) a proxy Tracking area update towards the LCN. The LCN checks (step e4) if the TAId provided belong to it. If the LCN corresponding to the TAId is different, the LCN_old forwards (step f4) the Proxy TA update to the LCN_new. The LCN_new responds (step g4) with a Proxy Tracking area update response to the LCN_new. The LCN_old sends (step h4) a proxy Tracking area update response to the SGSN including the LTE user terminal identity (L-TMSI) and the list of tracking areas in which the user terminal is allowed to roam without generating a Tracking Area update. The SGSN finally sends (step i4) a Routing Area update Accept to the user terminal including the information received from the LCN and the UMTS user terminal identity (P-TMSI) and the list of RAId in which the user terminal is allowed to roam without generating a Routing Area update. If there is a change of SGSN, the tunnel to the gateway is also updated (step j4) by the SGSN and a location update is also performed (step k4) towards the home subscriber server/home location register (HSS/HLR).

In an alternative, otherwise similar, embodiment (not shown), the SGSN sends the proxy Tracking Area update of step d4 directly to the LCN_new rather than via the LCN_old.

Downlink Data Transfer and Paging

Figure 8:
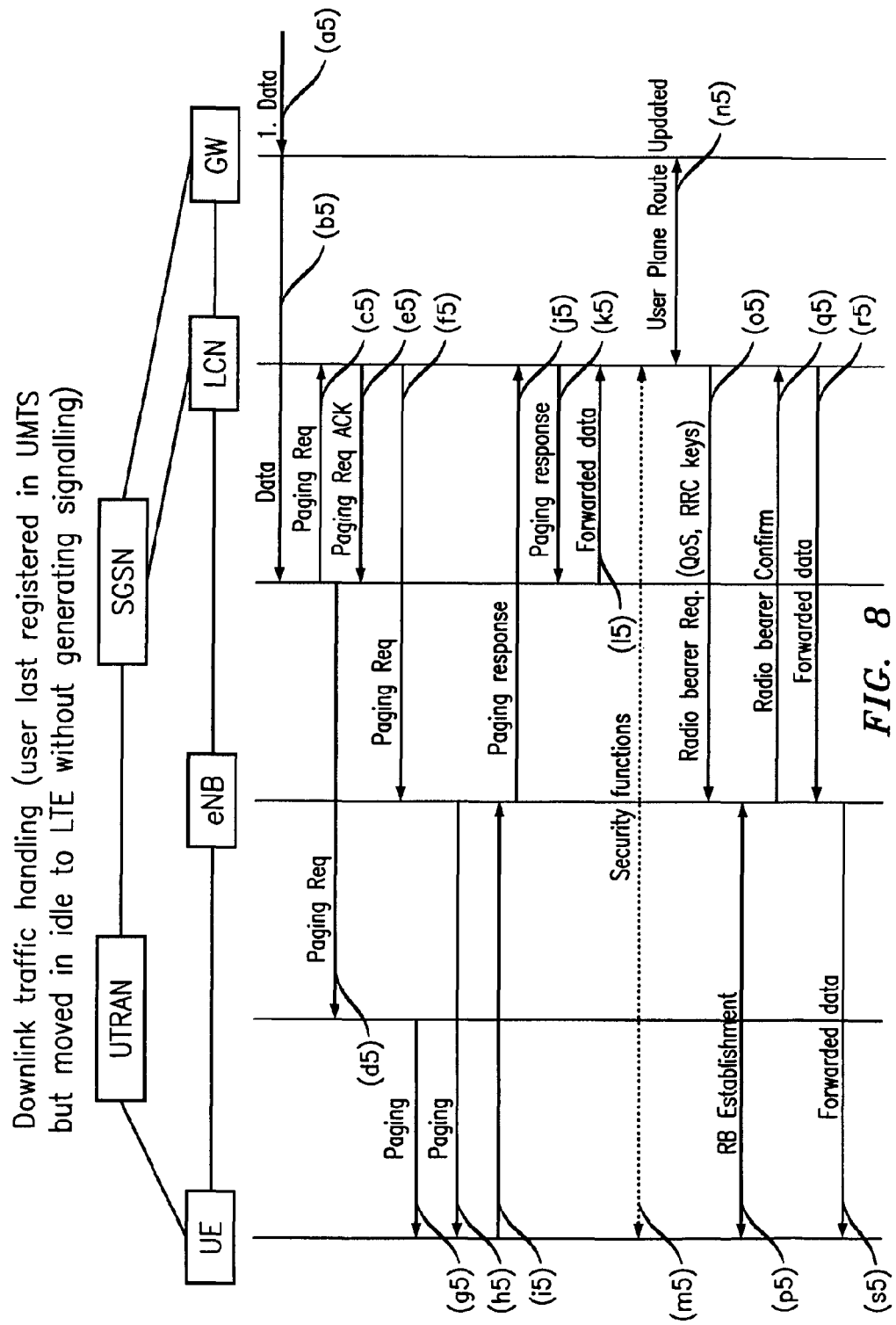
FIG. 8 is a sequence diagram illustrating a paging procedure to deliver data to the user terminal.

FIG. 8 relates to how the user terminal that is last registered in UMTS is paged in both UMTS and LTE systems when idle. The user terminal responds on the LTE system. On receipt of the paging response, the bearers (radio channels) are set up and the data sent to the user terminal via the LTE system.

As shown in FIG. 8, when a downlink packet arrives (step a5) at the Gateway (denoted GW in FIG. 8), the packet is then sent on to the last registered core network node (SGSN) (step b5). The SGSN triggers paging in both technologies (LTE and UMTS) by contacting the core network node (LCN) (step c5 and d5) in the other technology that was associated to the user terminal during the attach or Tracking Area/Routing Area update procedure. The SGSN sends (step e5) a paging message to UMTS radio access network RAN, which is also known as Universal Mobile Telecommunications System (UMTS) Terrestrial Radio Access Network (UTRAN). The LCN then also sends (step f5) a paging message to the eNB. Both the UTRAN (step g5) and eNB (step h5) will then page the user terminal over the radio interface. The user terminal responds (step i5) to the paging message over the technology it is currently camped on (i.e. LTE) to the eNB. The eNB forwards (step j5) the paging response to its core network node (LCN). The LCN then forwards (step k5) the paging response to the last registered core network node (SGSN) from which the LCN had received the paging request in step c5. The SGSN then forwards (step l5) to the LCN data that the SGSN had received in step b5. Security functions are executed (step m5) by the LCN. The gateway is updated (step n5) to request that data be sent to the LCN. Bearers between the LCN and the user terminal over LTE are established in steps o5, p5 and q5). The LCN then forwards (step r5) data to the eNB, and eNB sends (step s5) data to the user terminal.

GENERAL

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

LIST OF ACRONYMS

CN: Core Network
eNB: Enhanced NodeB
GPRS: General Packet Radio System
GW: Gateway
HSS/HLR: Home Subscriber Server/Home Location Register
LCN: LTE Core Network/LTE Core Network node
LTE: Long Term evolution.
L-TMSI: LTE Temporary Mobile Subscriber Identity
P-TMSI: Packet Temporary Mobile Subscriber Identity
RA: Routing Area
RAId: Routing Area Identity
RAN: Radio access Network
RNC: Radio Network Controller
SGSN: Serving GPRS Support Node
TA: Tracking Area
TAId: Tracking Area Identity UE: User Equipment
UMTS: Universal Mobile Telecommunications System
UTRAN; UMTS Radio Access Network

The invention claimed is:

1. A method of registering a mobile terminal in an area of overlapping cell coverage of first and second networks for wireless mobile telecommunications, the first and second networks being of different types and the first network comprising a controller, the method comprising registering the mobile terminal in respect of both networks by:
storing in the controller an identifier of the mobile terminal;
storing in the controller a first record of in which routing/tracking area the mobile terminal is located in the first network and a second record of in which routing/tracking area the mobile terminal is located in the second network; and
the first network providing the mobile terminal with information of both records and said identifier.

2. The method according to claim 1, in which the mobile terminal is provided with information of both records such that upon the mobile terminal roaming between the overlapping cells or groups of cells of the two networks, location update signalling to or from the mobile terminal does not occur.

3. The method according to claim 1, in which the controller which is in the first network performs a proxy/registration of the mobile terminal with a controller of the second network.

4. The method according to claim 1, in which the controller comprises a core network node.

5. The method according to claim 1, in which the mobile terminal moves out of an area covered by at least one of the cells that overlap, and the controller in the first network provides to a controller in the second network further records of into which new cells or groups of cells in each network the mobile terminal has moved.

6. The method according to claim 5, in which one of said further records is provided in consequence of the mobile terminal performing location update signalling.

7. The method according to claim 6, in which another of said further records is provided by look-up of a table of records relating cells or groups of cells in the first network to overlapping cells or groups of cells in the second network.

8. The method according to claim 5, in which the further records are used to determine whether the mobile terminal has roamed out of a coverage area of the controller in the second network.

9. The method according to claim 8, in which it is determined that the mobile terminal has roamed out of the coverage area of the controller in the second network, then the further records are used to identify a new controller.

10. The method according to claim 1, in which the mobile terminal is in idle mode.

11. The method according to claim 1, in which the first network is a WCDMA based network and the second network is an OFDMA based network.

12. The method according to claim 1, in which the first network is a UMTS network and the second network is a UMTS Long Term Evolution network.

13. The method according to claim 1, in which the first network is an OFDMA based network and the second network is a WCDMA based network.

14. The method according to claim 1, in which the first network is a UMTS-Long Term Evolution network and the second network is a UMTS network.

15. A method of a mobile terminal roaming in an area of overlapping cell coverage by first and second networks for wireless mobile telecommunications, the first and second networks being of different types and the first network comprising a controller, the method comprising registering the mobile terminal in respect of both networks by:
storing an identifier of the mobile terminal in the controller;
storing in the controller a first record of in which routing/tracking area the mobile terminal is located in the first network and a second record of in which routing/tracking area the mobile terminal is located in the second network;
the first network providing the mobile terminal with information of both records such that upon the mobile terminal roaming between the overlapping cells or groups of cells of the two networks, location update signalling to or from the mobile terminal does not occur.

16. A telecommunications system first and second networks for wireless telecommunications;
the first and second networks having overlapping cell coverage; the first and second networks being of different types, and the first network comprising a controller and a transmitter;
the controller being operative to store an identifier of a user terminal, a first record of in which routing/tracking area the user terminal is located in the first network, and a second record of in which routing/tracking area the user terminal is located in the second network so as to register the user terminal in respect of both networks;
the transmitter being operative to provide the user terminal with information of both records and the identifier.

17. A controller configured to be used in a telecommunications system comprising first and second networks for wireless telecommunications, in which the networks have overlapping cell coverage and are of different types, and wherein the first network comprises the controller and a transmitter, wherein
the controller being operative to store an identifier of a user terminal, a first record of in which routing/tracking area the user terminal is located in the first network, and a second record of in which routing/tracking area the user terminal is located in the second network so as to register the user terminal in respect of both networks; and
the controller being operative to supply both records and the identifier to the transmitter for providing the user terminal with information of both records and the identifier.

18. The controller according to claim 17, in which the controller is operative to supply both records and the identifier to the transmitter for providing the user terminal with information of both records and the identifier, such that upon the user terminal roaming between the overlapping cells or groups of cells of the two networks, location update signalling to or from the user terminal does not occur.

19. The controller according to claim 17, in which the controller which is in the first network performs a proxy registration of the user terminal with a controller of the second network.

20. The controller according to claim 17, in which the controller comprises a core network node.

21. The controller according to claim 17, in which, in use, upon the user terminal moving out of an area covered by at least one of the cells that overlap, the controller provides to a controller in the second network further records of into which new cells or groups of cells in each network the user terminal has moved.

22. The controller according to claim 21, in which the further records are used to determine whether the user terminal has roamed out of a coverage area of the controller in the second network.

23. The controller according to claim 22, in which it is determined that the user terminal has roamed out of the coverage area of the controller in the second network, then the further records are used to identify a new controller.

24. The controller according to claim 21, in which one of said further records is provided in consequence of the user terminal performing location update signalling.

25. The controller according to claim 24, in which another of said further records is provided by look-up of a table of records relating cells or groups of cells in the first network to overlapping cells or groups of cells in the second network.

26. The controller according to claim 17, in which the first network is a WCDMA based network and the second network is an OFDMA based network.

27. The controller according to claim 17, in which the first network is a UMTS network and the second network is a UMTS-Long Term Evolution network.

28. The controller according to claim 17, in which the first network is an OFDMA based network and the second network is a WCDMA based network.

29. The controller according to claim 17, in which the first network is a UMTS-Long Term Evolution network and the second network is a UMTS network.

30. A mobile terminal comprising means to receive from a controller in a first network in a telecommunications system comprising first and second networks for wireless telecommunications, said networks having overlapping cell coverage and being of different types, an identifier of the mobile terminal, a first record of in which routing/tracking area the mobile terminal is located in the first network, and a second record of in which routing/tracking area the user terminal is located in the second network, such that upon the mobile terminal roaming between the overlapping cells of the two networks, location update signalling to or from the mobile terminal does not occur.

31. The mobile terminal according to claim 30, in which the controller which is in the first network performs a proxy registration of the mobile terminal with a controller of the second network.

32. The mobile terminal according to claim 30, in which, in use, the mobile terminal moves out of an area covered by at least one of the cells that overlap, and the controller provides to a controller in the second network further records of into which new cells or groups of cells in each network the mobile terminal has moved.

33. The mobile terminal according to claim 32, in which one of said further records is provided in consequence of the mobile terminal performing location update signaling.

34. The mobile terminal according to claim 33, in which, in use, another of said further records is provided by look-up of a table of records relating cells or groups of cells in the first network to overlapping cells or groups of cells in the second network.

35. The mobile terminal according to claim 32, in which the further records are used to determine whether the mobile terminal has roamed out of a coverage area of the controller in the second network.

36. The mobile terminal according to claim 35, in which it is determined that the mobile terminal has roamed out of the coverage area of the controller in the second network, then the further records are used to identify a new controller.

37. The mobile terminal according to claim 30, in which the mobile terminal is in idle mode.

* * * * *